United States Patent [19]
Ball et al.

[11] 3,791,527
[45] *Feb. 12, 1974

[54] ROTARY FILTER APPARATUS

[75] Inventors: Harry Ball, Piscataway; Henry A. Steward, Califon, both of N.J.

[73] Assignee: Technical Fabricators, Inc., Nutley, N.J.

[ * ] Notice: The portion of the term of this patent subsequent to Mar. 28, 1989, has been disclaimed.

[22] Filed: Oct. 21, 1971

[21] Appl. No.: 191,507

[52] U.S. Cl. ............................................. 210/387
[51] Int. Cl. ............................................ B01d 33/12
[58] Field of Search ............. 210/387, 391, 401, 66

[56] References Cited
UNITED STATES PATENTS

| | | | |
|---|---|---|---|
| 3,651,946 | 3/1972 | Ball et al. | 210/387 |
| 2,823,806 | 2/1958 | Havlan | 210/387 |
| 3,372,811 | 3/1968 | Arnold et al. | 210/387 |
| 3,692,674 | 9/1972 | Wood | 210/401 |
| R24,430 | 2/1958 | Hornbostel | 210/387 |
| 3,206,030 | 9/1965 | Estabrook | 210/387 X |

*Primary Examiner*—Samih N. Zaharna
*Assistant Examiner*—T. A. Granger

[57] ABSTRACT

Rotary filter apparatus is provided with a rotary drum having a perforated peripheral wall extending into a tank containing slurry to be filtered. A sheet of filter paper is continuously fed from a source of supply to be wrapped around the drum with suction within the drum to draw the liquid from the slurry therethrough so that solids are filtered onto the paper. Between the paper and the drum a flexible endless screen is wrapped around with part of the screen being fed from the drum with the paper sheet attached thereto onto a guide device. This guide device acts to strip off the mesh screen and attached paper sheet with the solids thereon to carry the paper sheet away from the machine for disposal. The guide device includes stripping means with part thereof covering an exposed part of the peripheral wall to provide a seal for the suction.

16 Claims, 10 Drawing Figures

ROTARY FILTER APPARATUS

BROAD STATEMENT OF INVENTION

The present invention relates to rotary filter apparatus and is particularly concerned with an endless mesh screen interposed between a sheet of filter paper wrapped around a rotary drum and including sealing means for maintaining suction of the rotary drum.

DESCRIPTION OF THE PRIOR ART

It has been known in the prior art to use rotary filter apparatus having a rotary drum peripherally perforated and mounted on a horizontal axis to extend into a tank containing slurry to be filtered. In the prior art the filtering has been performed by covering the perforated surface with a fabric and then applying a layer of filter material in finely divided form, such as diatomaceous earth, powdered coal or perlite. Suction is applied within the drum to draw the liquid through the covering coating and allow the solids to build up on the surface. A scraper then shaves off the solids in a continuous action during filtration, but in the course of time the coating requires replacement which necessitates stopping the apparatus for a considerable amount of time.

It is known to the applicant to provide rotary filter apparatus where the covering coating on the perforated drum is replaced by a continuously fed sheet of filter paper, such as newsprint, to provide the filtering operation. In this apparatus which is disclosed in U.S. Pat. application Ser. No. 889,580 filed Dec. 31, 1969 and now U.S. Pat. No. 3,651,946, in the name of Harry Ball, et al. the sheet of paper is supplied to pass underneath the tank and up one side thereof to be fed onto the peripheral perforated surface, be wrapped around substantially the entire periphery of the drum and led off from the drum at an area adjacent to the feed. Suction is applied to the filter drum in the conventional manner so that the liquid in the slurry is drawn through the filter paper allowing the solids to be caked thereon, and the caked sheet is stripped from the drum by a stripping device to be led therefrom for disposal.

In the operation of the rotary filter apparatus using a continuously supplied sheet of filter paper the stripping off of the caked sheet is a critical element for continuous satisfactory operation. If the filter paper is weakened by the slurry, or the solids cake such that there is difficulty in stripping off the filter, the operation may not be able to satisfactorily continue. Therefore, it would be desirable to have a device that would insure that the caked filter paper would be satisfactorily removed from the rotary drum in the continuous operation.

DESCRIPTION OF THE INVENTION

The present invention provides rotary filter apparatus utilizing a sheet of filter paper that is continuously fed onto an endless mesh belt on a perforated drum to facilitate the removal of the filter paper from the drum after the filtering operation.

In the present invention rotary filter apparatus is provided in which an endless mesh screen is wrapped around a rotary drum and including a loop thereof mounted in a carrier and guide assembly to facilitate the removal of a continuously fed sheet that is wrapped around the endless belt.

A further provision of the present invention is a rotary filter apparatus including a plastic mesh screen in the form of an endless belt mounted on a rotary drum with part of the screen passing through a stripping guide device that is pivotal to facilitate the initial feeding of filter paper that is fed over the mesh screen for the filtering operation.

There is also provided in the present invention rotary filter apparatus in which an endless plastic mesh belt is located between a continuously fed sheet of filter paper and a rotary drum, and part of the mesh belt is fed into a stripping means that facilitates the removal of the filter paper from the rotary drum after the filtering operation.

A further provision of the present invention is to provide the rotary filter apparatus in which an endless plastic mesh screen is positioned between a continuously fed sheet of filter paper and a rotary perforated drum, and stripping means facilitates removal of the filter paper from the drum and also seals an exposed area on the drum.

A still further provision of the present invention is rotary filter apparatus wherein an endless mesh screen is interposed between a rotary perforated drum and a continuously fed sheet of filter paper with part of said mesh screen passing through a device that facilitates the stripping off of the filter paper and includes an extension to provide a seal for an exposed area on the perforated drum that is located between where the filter paper feeds onto the drum and feeds off from the drum after being wrapped therearound.

In a preferred embodiment of the invention a rotary drum is mounted in a tank filled with slurry to be filtered, and suction is applied within the drum which has perforations therein allowing the liquid to be drawn into the drum. An endless mesh screen is provided that is wrapped around substantially the entire periphery of the rotary drum. A sheet of filter paper is fed from a source of supply onto the mesh screen and wrapped around substantially the entire periphery of the rotary drum in abutting relation with the screen. The area where the screen and the filter paper feeds onto the drum is adjacent a top edge of the tank, and the exit area where the superposed filter paper and screen are led off from the perforated drum is adjacent thereto. The superposed filter paper and mesh screen perform a filtering operation as they pass around and through the slurry in the tank, and they are led off at the exit area onto a stripping means and guide assembly. The mesh screen is looped through the guide assembly to return to the feed area on the perforated drum. The guide assembly includes a stripping element that facilitates the removal of the filter paper and the mesh screen from the perforated drum, and the filter paper including the solids deposited thereon is then carried off from the guide assembly for disposal. The mesh screen acts as a carrier web for the movement of the filter paper, and the stripping means that facilitates the removal of the filter paper further provides a seal for the exposed area of the perforated drum between the feed and exit areas. The stripping means is disclosed as a flexible piece of metal paneling or molded plastic having a sharp bend creating a knife edge for the stripping action and a long extending part to provide a sealing function over the exposed area.

In the preferred embodiment the filter paper is provided in a large roll of newsprint that is fed around rollers or shafts under the tank and up along one side thereof to be directed onto the endless mesh belt that is continually passing around the perforated drum. The endless belt or web can be formed of wire or plastic mesh and a part thereof is looped through an elongated carrier and guide assembly which carries the filter paper off for disposal. The carrier and guide assembly includes elongated bars mounted in a substantially horizontal position during normal operation and adapted to pivot upwardly for loosening the carrier web so that a new supply of filter paper can be fed into the apparatus. The carrier and guide assembly includes shafts mounted between the elongated bars for the guiding of the superposed filter paper and mesh screen thereover, and adjustment means are provided on the carrier and guide assembly for the location of its normal position and insuring the tightness of the mesh screen.

The advantages of the present invention is an improvement in the removal of the filter sheet with the solids deposited thereon. This is provided by the stripping means making a positive contact with the moving mesh screen to insure continuous removal from the perforated drum without slowing or bunching. A further advantage is that this intermediate mesh screen provides additional filtering, and directing the filter paper along the carrier and guide assembly carries the filter sheet with the solids thereon further from the rotary drum so that it is easier to dispose of the caked paper. The endless mesh screen also provides added strength to the filter medium which may be weakened from the slurry, and this also facilitates removal during the stripping and disposal function.

The stripping means also functions to provide a sealing feature as a further advantage of the present invention. The stripping means is an element provided with a knife edge that is removable from the apparatus when it is necessary to lead in a new supply of paper, and this stripping and sealing element includes a panel part that extends downwardly from the positioned knife edge to seal the exposed area between the entrance of the filter paper and the exit thereof from the perforated drum.

The nature of the present invention will become more clearly apparent and better understood from the following description and accompanying drawings in which.

It will be understood that the accompanying drawings are merely diagrammatic illustrations, and reference should be made to the following description for a more detailed explanation of the structure involved.

Figure 1:
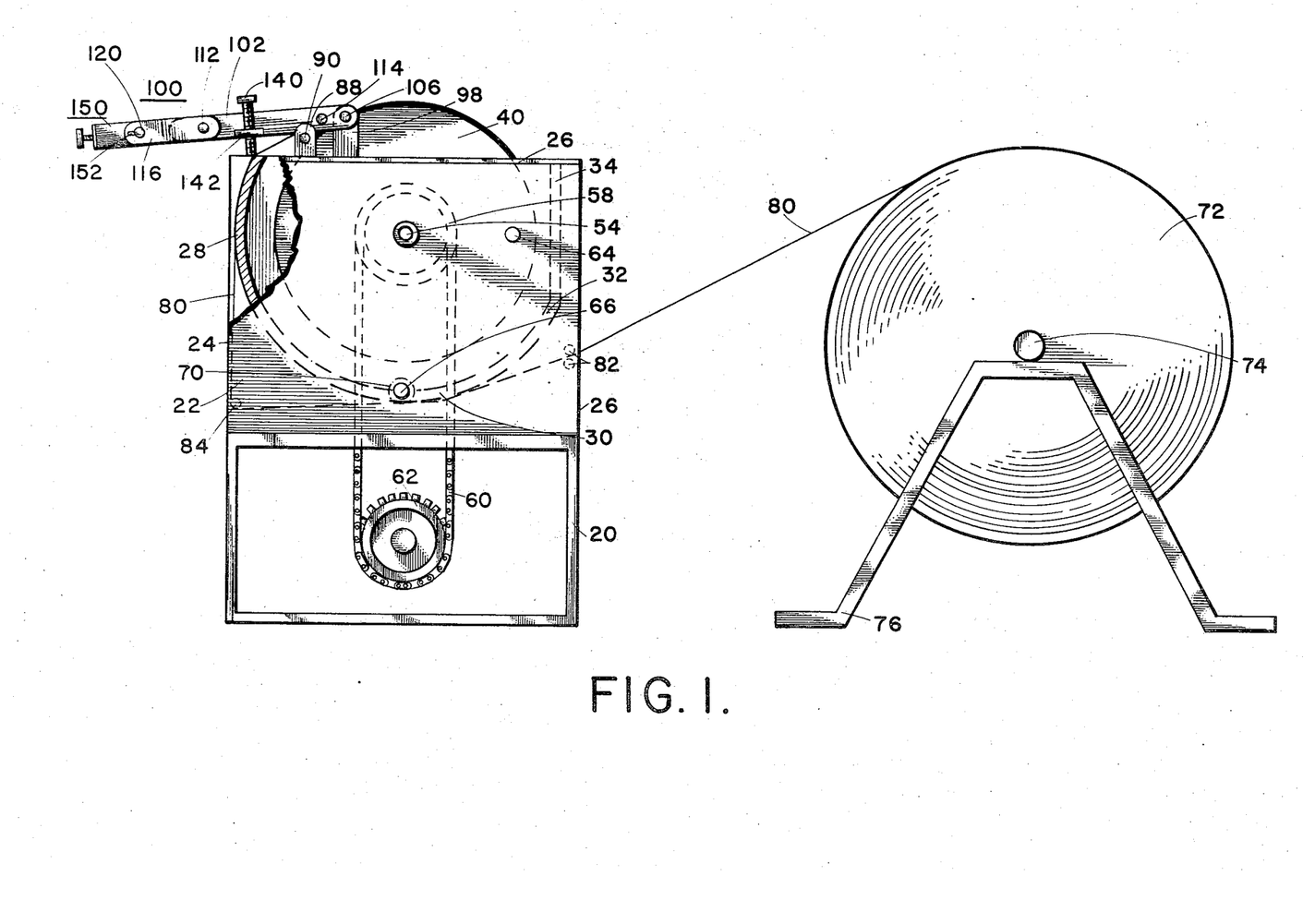
FIG. 1 is an elevational view of rotary filter apparatus embodying the present invention with part of the apparatus broken away or shown in section for clarity.
Figure 3:
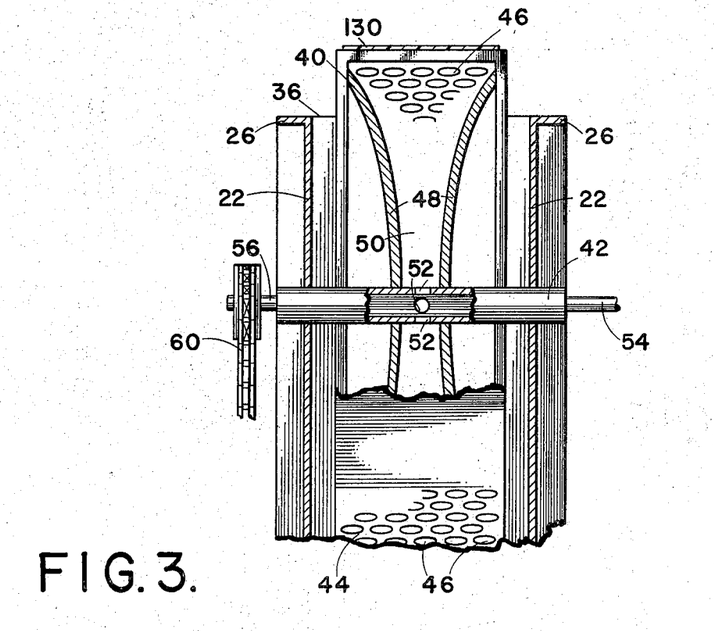
FIG. 3 is an end elevational view of the rotary filter apparatus with part thereof broken away or shown in section for clarity.

Referring to FIG. 1 of the drawings, the filter apparatus embodying the present invention includes a base support 20 on which is positioned a tank 24 having a circular-shaped lower portion including flat side walls 22 that extend beyond the tank and terminate in end channels 26 that are supported on base 20 and extend vertically upward and also along the top edge of the tank. Tank 24 includes a circular-shaped front end wall 28 connected to a circular-shaped bottom wall 30 which is further connected to a substantially circular-shaped rear wall 32 that terminates in a vertical upper straight section 34. As seen in FIGS. 1 and 3, tank 24 has an open top section aligned with upper end channels 26.

A rotary drum 40 has most of its body portion extending into tank 24. As shown in FIGS. 1 and 3, drum 40 is mounted on a hollow shaft 42 located in tank 24 so that most of drum 40 is submerged in the slurry within tank 24, and it is seen that the submerged outer periphery of drum 40 is concentrically spaced from walls 28, 30, 32 and 34. Drum 40 has a cylindrical peripheral wall 44 which includes a large number of perforations 46 formed throughout its periphery. The size and the spacing of the perforations are not critical to the present invention. An example of size and spacing of the perforations in a similar rotary drum is given in the aforementioned patent application, but the size and spacing of the perforations 46 in the present invention can be larger than this example since there is additional filtering provided by the carrier web as will be described hereinafter.

As seen in FIG. 3, rotary drum 40 includes side walls 48 in the form of discs which extend between the hollow shaft 42 and outer peripheral wall 44 to form a vacuum chamber 50 therebetween. Chamber 50 is in communication with hollow shaft 42 by means of a plurality of openings 52 formed in the shaft. The disc walls 48 curve inwardly as they extend from peripheral wall 44 to be joined to shaft 42 to provide for a maximum slurry capacity in the tank 24 and also providing a streamlined passageway for the filter liquid in passing through perforations 46 on its way to hollow shaft 42.

Shaft 42 extends outwardly from the side of tank 24 to a suction outlet 54 which is connected to a suction pump (not shown) to provide suction to the vacuum chamber 50 so that the filtered liquid is sucked therefrom and delivered to a storage area (not shown) for further use or for disposal as desired in its purified state. The other end of shaft 42 extends through the other side of tank 24 and terminates in a rotating connection 56 onto which is fixed a sprocket wheel 58 that is driven by a chain 60. As shown in FIG. 1, chain 60 is driven by a sprocket wheel 62 which is mounted in support 20 to provide the driving means for rotary drum 40. The power for sprocket wheel 62 includes a motor and speed reduction unit (not shown) that could be mounted within support 20. A typical drive mechanism for this purpose is illustrated in the aforementioned patent application, and the speed of the drive is understood not to be critical to the invention as long as the operation can be provided at a continuous rate.

Tank 24 includes an inlet connection 64 in the side wall 26 as shown in FIG. 1 into which the slurry is pumped to be filtered. Tank 24 further includes a drain 66 located near the bottom of the tank which is normally closed by a cap 70. Tank 24 also can include an overflow conduit (not shown) in the upper section thereof.

The filter medium is supplied in the form of a roll of paper sheet 72, such as newsprint, which is mounted on an axis 74 supported on a stanchion 76. The advantages of using newsprint and sample sizes thereof are set forth in the aforementioned patent application.

As seen in FIG. 1, a sheet of paper 80 is unrolled from the supply 72 and fed between rollers or shafts 82 mounted in the extended sides 22 of tank 24. The extended flat sides 22 provide an opening or passageway above support 20 and below tank 24 for the passage of paper sheet 80. Rollers 82 are positioned at the rear of the apparatus on the side adjacent supply means 72, and at the front of the apparatus a roller 84 is mounted between sides 22 for paper sheet 80 to pass therearound to be directed upwardly along the outside of front wall 28.

Front wall 28 and a rear wall 34 can be considered end walls terminating in horizontal top edges defined by the upper channels 26. That part of channel 26 adjacent end wall 28 can be considered the front top edge, and that part of channel 26 where the upper part of end wall 34 terminates can be considered the rear top edge.

Figure 4:
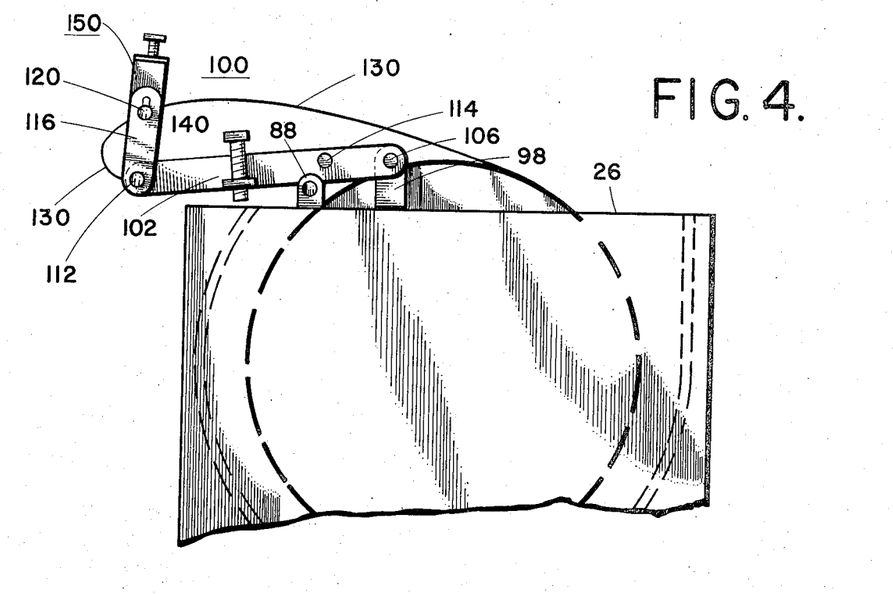
FIG. 4 is a side elevational view of the rotary drum and tank with the carrier and guide assembly thereon having part thereof pivoted upwardly.
Figure 5:
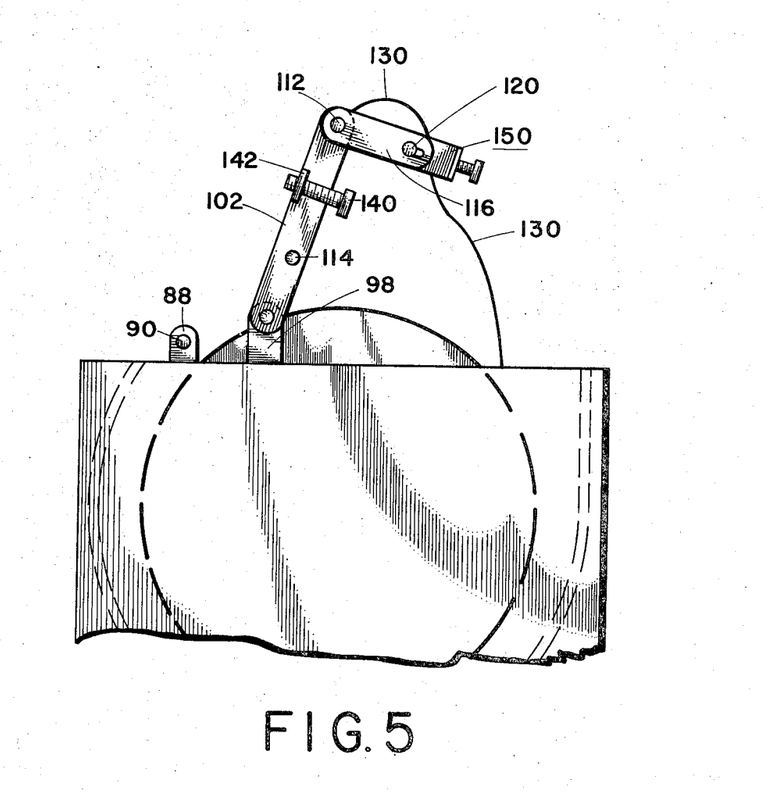
FIG. 5 is a view similar to FIG. 4 with the entire carrier and guide assembly pivoted upwardly.
Figure 6:
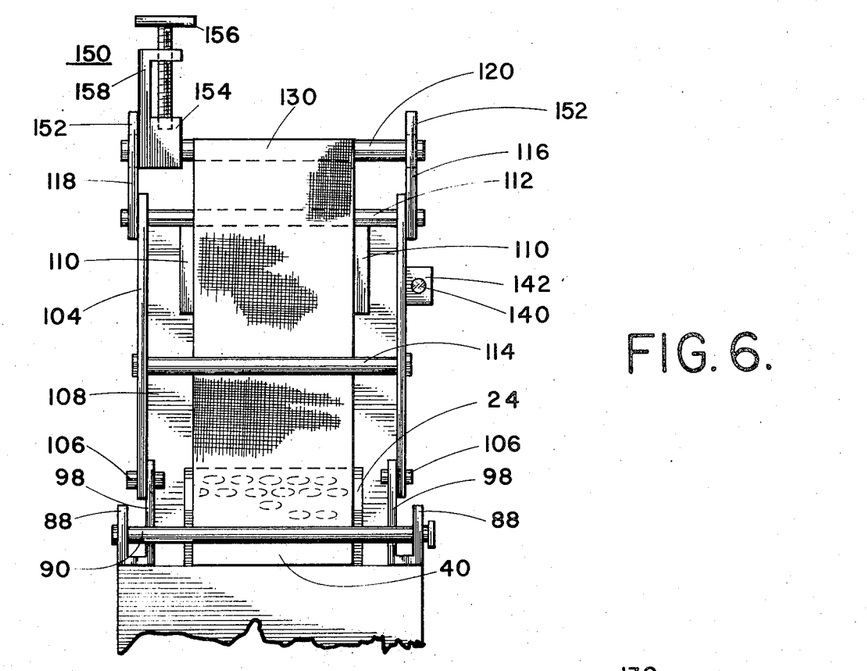
FIG. 6 is an end elevational view of the carrier and guide assembly in an upwardly pivoted position.

On each front top edge of channel 26 a flange 88 is provided, one of which is shown in FIGS. 1, 4 and 5, and both of which are shown in FIG. 6. A roller or shaft 90 similar to rollers 82 and 84 extends between flanges 88 and provides the top rotary support for paper sheet 80 to pass therearound and be directed downwardly to feed onto rotary drum 40 which already has a wrapped-around mesh screen thereon as will now be explained.

A carrier and guide assembly 100 is pivotally mounted on a pair of flanges 98 that are fixed respectively to the upper channels 26. Flanges 98 are located adjacent and slightly rearward of flanges 88. Guide assembly 100 includes means for guiding an endless carrier web and has associated therewith a stripping element which extends in part to cover an exposed area on rotary drum 40 as will be explained hereinafter. As shown in FIG. 1 and FIGS. 4–7 guide assembly 100 comprises a pair of elongated side bars 102 and 104 that are respectively connected to swing on pivots 106 interconnecting the flanges 98 with the side bars. A plate 108 extends between side bars 102 and 104, and a pair of spaced guide bars 110 are mounted to extend from one side of plate 108 as shown in FIG. 6. As mentioned hereinabove, one end of each side bar 102 and 104 is connected to pivot on flange 98. The other ends of side bars 102 and 104 terminate in openings through which is mounted a pivot shaft 112.

Figure 7:
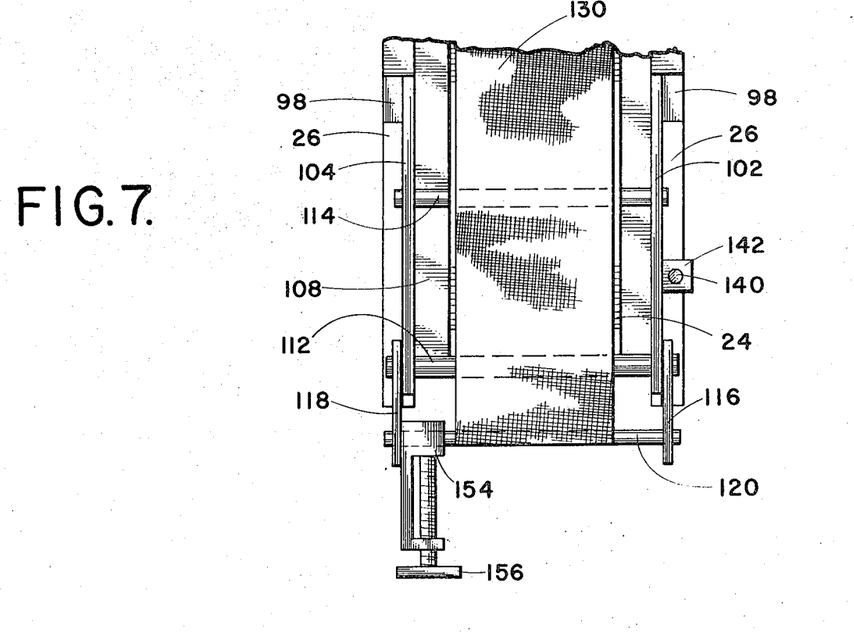
FIG. 7 is a top plan view of the carrier and guide assembly in its normal position as shown in FIG. 1.

A first shaft 114 extends between bars 102 and 104 at opposed intermediate areas thereof, and shaft 114 is most clearly shown in FIGS. 6 and 7. A pair of bar extensions 116 and 118 have their one ends respectively mounted on pivot shaft 112 and extend therefrom to have their other ends spaced apart and joined together by a second shaft 120.

Figure 8:
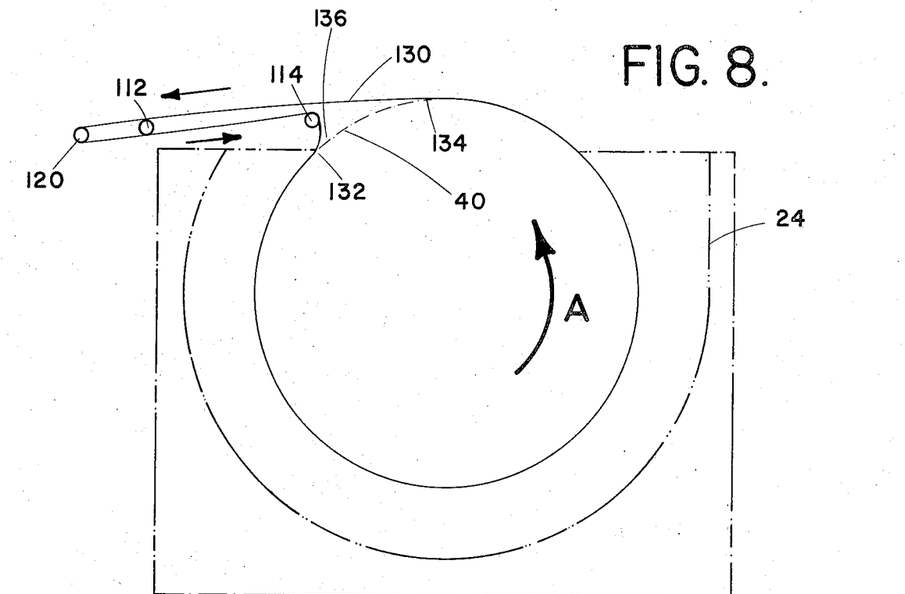
FIG. 8 is a view showing the path of the endless carrier web during normal operation with parts of the rotary filter apparatus shown in phantom.

The purpose of guide bars 120, first shaft 114 and second shaft 120 is to provide a guide path for an endless carrier web 130 as will now be described. Web 130 is wrapped around substantially the entire periphery of rotary drum 40 and can be considered to feed onto and first contact the rotary drum at an area indicated by numeral 132 as shown in FIG. 8. Web 132 is a mesh form of material which can be made of wire or plastic as long as it is flexible so as to be wrapped around rotary drum 40 and be in contact therewith up to an area designated by numeral 134 from which it detaches from the rotary drum due to the function of stripping means which will be explained hereinafter. As the drum 40 rotates in the direction shown by arrow A in FIG. 8, web 130 detaches from drum 40 at area 134 and passes over plate 108 when guide assembly 100 is in its normal operating position as shown in FIG. 1. Web 130 is then looped around second shaft 120 to reverse its direction of movement back toward drum 24 and pass above first shaft 114 from whence it is again directed onto drum 40. In considering the flow path of web 130 illustrated in FIG. 8, it will be appreciated that there is an area 136 between areas 132 and 134 on rotary drum 40 that is not covered by the web nor filter paper 80. Since this area 136 includes perforations 46 that are subjected to suction, sealing means is provided to cover this area as will be explained hereinafter.

Figures 9, 10:
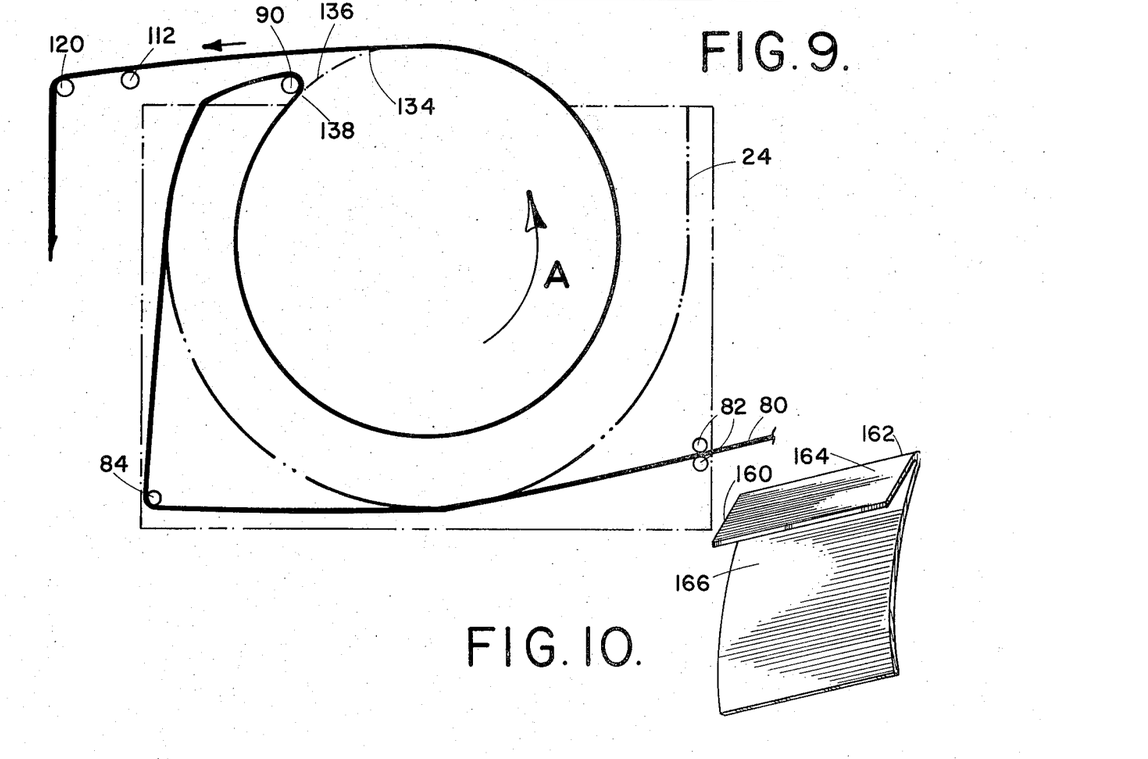
FIG. 9 is a view illustrating the path of the sheet of filter paper passing through the rotary filter apparatus during normal operation with parts of the apparatus shown in phantom.
FIG. 10 is a view in perspective of the stripping means and sealing element.

FIG. 9 illustrates the flow path of the sheet paper 80, which is fed in over roller shafts 82, 84 and 90 as explained hereinbefore. After sheet paper 80 passes over roller 90, it passes downwardly to come into contact with carrier web 130 and is wrapped around substantially the entire perimeter of rotary drum 40 in the same manner as web 130 and departs from drum 40 at the same departure area 134. The area where sheet paper 80 makes contact with web 130 after passing over roller 90 is indicated by numeral 138, and it will be appreciated that area 138 is vertically lower than area 132 since web 130 makes an earlier contact with drum 40 and then receives sheet paper 80 thereon.

It its normal operating position guide assembly 100 is in a substantially horizontal position with slight downward inclination from pivot 106 as shown in FIG. 1. In this position web 130 is tightly pressed against second shaft 120 so that it is in tight engagement as it is wrapped around rotary drum 40. The normal operating position of guide assembly 100 is determined by a bolt 140 that is threadedly engaged with a flange 142 mounted on side bar 102. Bolt 140 is rotated until its lower end extends to the desired position where it will be in contact with channel 26 as shown in FIG. 1.

An adjustment means 150 is provided to regulate the position of second shaft 120 to insure that web 130 is normally tightly engaged. The mounting of shaft 120 is in slots 152 located at the ends of bar extensions 116 and 118. Adjustment means 150 includes an enclosure 154 in which shaft 120 is located, and enclosure 154 is slidable by rotation of a connected bolt 156 held by an attached channel 158. Rotation of bolt 156 moves shaft 120 back and forth in slots 152 to determine the tension of web 130.

Figure 2:
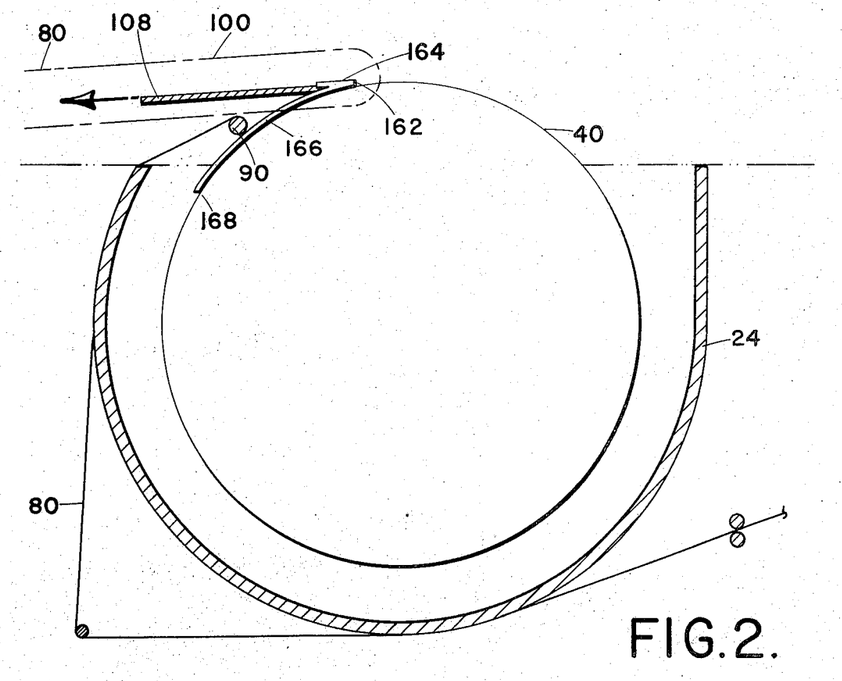
FIG. 2 is a sectional view of the rotary drum and tank with adjacent structure removed or shown in phantom for clarity.

An improved stripping means 160 is provided in the present invention which not only facilitates the detachment of the superposed paper sheet 80 and carrier web 130 but has a part thereof normally extending downwardly to cover exposed area 136. Stripping means 160 is most clearly shown in FIGS. 2 and 10 and may be provided of thin metal or plastic as long as a knife edge 162 is formed therein. If the sealing means 160 is formed of thin metal, it is folded to form knife edge 162 so that when placed in the operative position as shown in FIG. 2, an upper panel 164 lies along the top of plate 108, and a longer panel 166 extends downwardly in an arc having a circumference the same as the circumference of rotary drum so as to fit in abutting relationship with peripheral wall 44 and extend downwardly to an area 168 on rotary drum 40 that is below area 138 where the paper sheet 80 contacts the web 130. If the sealing means is formed from plastic material, it is molded to have the same size panels 164 and 166 with the configuration as shown in FIGS. 2 and 10 so as to completely cover area 136. A feature of the invention is that sealing means 160 which includes the knife edge 162 that acts as a stripping means is removable from the apparatus as will be explained hereinafter in connection with the operation.

From a consideration of FIG. 2 the operation of stripping edge 162 can be appreciated. Paper sheet 80 is normally passing around rotary drum 40 in a superposed position on web 130, and as it approaches area 134 (see FIG. 9) the combined sheet 80 and web 130 is contacted by the knife edge 162 to insure that it is lifted off and detached from rotary drum 40 to be carried outwardly therefrom along guide assembly 100 as shown in FIG. 7. The detached carrier web 130 then loops around shaft 120 as explained hereinbefore to return to drum 40 while the detached sheet 80 is carried away from the apparatus for disposal as shown in FIG. 9. The lower part 166 of stripping and sealing means 160 extends in an arc as explained previously to insure that the suction is maintained within drum 40 and not lost through the exposed gap 136 formed between the entrance and exit areas on the drum.

In the operation of the apparatus the endless web 130 runs continually in its flow path as shown in FIG. 8 during the rotation of drum 40. Paper sheet 80 is fed continuously around rollers 82, 84 and 90 to follow in the flow path shown in FIG. 9 so that the suction applied to chamber 50 and acting on perforations 46 pulls the liquid from the slurry therethrough and out of conduit 54 leaving the solids deposited upon the outside of paper sheet 80. Paper sheet 80 with the solids deposited thereon passes through a guide assembly 100 for easy continuous disposal. During the operation the combined sheet 80 and web 130 is removed at area 134 by stripping means 160 mounted on the end of plate 108, and stripping means 160 includes a downwardly extending portion 166 that covers the gap area to seal the suction in drum 40 between the entrance and the exit of the paper sheet. Guide assembly 100 provides a positive removal of the paper sheet 80 due to the use of the novel endless carrier web 130 and the novel stripping means 160.

When the supply of paper 72 has been used up, it is necessary to mount a new supply roll 72 and feed the end of the new sheet 80 into the filter apparatus. For this purpose guide assembly 100 can be swung upwardly as shown in FIG. 5 in order to open the area adjacent the feed entrance at the front of the machine so that the apper 80 can be fed therein. As guide assembly paper is swung upwardly, it is possible to remove stripping means 160 if desired. In this manner stripping means 160 is easily cleaned or replaced if necessary. When guide assembly 100 is in the upward position shown in FIG. 5, carrier web 130 is in a slack condition as shown, and the end of new supply sheet 80 can be easily passed around roller 90 and fed through the machine. Stripping means 160 is placed in position as shown in FIG. 2 with its lower panel 166 between the carrier web 130 and perforated drum 40. Guide assembly 130 is then lowered into the position shown in FIG. 1, and the sheet 80 that has been fed around drum 40 is then fed through the guide assembly 100 and arranged for filtering operation and disposal as shown in FIG. 1.

FIG. 4 illustrates a position of guide assembly 100 where bar extensions 116 and 118 only have been swung upwardly on pivot shaft 112 for the purpose of relieving the tension on carrier web 130. This position shown in FIG. 4 can be utilized where it is necessary to adjust web 130 or possibly mount a replacement or repair a break in web 130.

In FIG. 5 the side bars 102 and 104 have been swung to the upward position while the bar extensions 116 and 118 have been further swung to be 90° relative thereto. In the FIG. 5 position for loading a new paper supply, it is also possible that bars extensions 116 and 118 could remain in alignment with bars 102 and 104 as shown in FIG. 1 so that they project upwardly and provide the slackened condition of carrier web 130.

From the above description it is clear that the present invention discloses a rotary filter apparatus having a novel guide assembly utilizing an endless carrier belt that provides a positive detachment or stripping of the paper sheet from the rotary drum. A further novel feature lies in the provision of a sealing means having a knife edge to provide the stripping function and an extension part that seals the gap between the entrance and exit of the paper sheet to preserve the suction in the rotary drum chamber.

A critical feature of the invention is the endless web 130 which can be formed of wire or plastic which can have openings in the size of 20 mesh-200 mesh. The plastic web can be formed of Saran or Nylon or any polyester synthetic plastic that will provide the mesh indicated. The novel sealing plate 160 that functions as a stripping means can be formed of thin metal or of molded plastic.

It will be understood that various changes and modifications may be made by those skilled in the art in the particular features of the apparatus which has been described above for illustrative purposes without departing from the scope of the invention as defined by the following claims.

We claim:

1. Filter apparatus for separating solids from a slurry comprising a tank having an inlet and an outlet for said slurry, said tank having a bottom wall, side and end walls;

a hollow rotary drum supported with its axis substantially horizontal and extending into said tank for immersion of its lower section into the slurry, said drum having a cylindrical peripheral wall with perforations therein;

a top edge of each end wall located in a horizontal plane above said drum axis;

a carrier and guide assembly positioned above and adjacent to one of said top edges;

an endless carrier web mounted within said carrier and guide assembly, part of said web wrapped around substantially the entire periphery of said drum;

supply means located adjacent said tank and including a roll of paper unwindable therefrom in a continuous sheet;

means continuously feeding said sheet from said supply means adjacent the outer side of said bottom tank wall and further adjacent the outer side of one of said end walls up to said one top edge, said sheet extending from said one top edge to overlie said carrier web and be wrapped around substantially the entire periphery of said drum;

said carrier and guide assembly including stripping means located adjacent to the periphery of said drum whereby said sheet and carrier web are detached from said drum to be fed along said carrier and guide assembly, said stripping means being located closely adjacent to an area on said drum where said sheet and carrier web are fed thereon so that an exposed area on said drum is formed between said feeding area and said stripping area; and suction means continuously operable within said drum to keep said wrapped-around sheet and carrier web pressed thereagainst and to cause the solids from the slurry to separate onto said sheet as the liquid of the slurry passes through said sheet and said carrier web and through said perforations for discharge from said drum.

2. Filter apparatus according to claim 1 in which said carrier and guide assembly comprises a pair of elongated side bars having a plate mounted therebetween with said stripping means located at one end of said plate.

3. Filter apparatus according to claim 2 in which a pair of pivot means are fixed in opposing relation on said apparatus adjacent said one top edge, and said elongated side bars are respectively mounted on said pivot means for swingable movement thereabout.

4. Filter apparatus according to claim 2 in which a first shaft extends between said side bars at an intermediate area thereof, a pivot shaft is positioned between the remote ends of said side bars, bar extensions are mounted on said pivot shaft for swingable movement thereabout, a second shaft is positioned between the remote ends of said bar extensions, and said carrier web is positioned to pass over said first shaft and loop around said pivot shaft and said second shaft.

5. Filter apparatus according to claim 4 in which said first shaft is located adjacent said exposed area of said drum.

6. Filter apparatus according to claim 2 in which a pair of spaced guide bars are mounted between said side bars to extend from said plate to guide said carrier web in its movement.

7. Filter apparatus according to claim 1 in which vertical adjustment means is mounted on said carrier and guide assembly.

8. Filter apparatus according to claim 7 in which said vertical adjustment means comprises a threaded bolt adjustably mounted in said assembly with an end thereof adapted to contact said top edge of said end wall.

9. Filter apparatus according to claim 4 in which a slot is formed in each of said bar extensions, said second shaft has its ends slidably mounted in said slots, and shaft adjustment means is mounted on an end of one of said bar extensions to determine the position of said second shaft within said slots.

10. Filter apparatus according to claim 9 in which said shaft adjustment means comprises a threaded bolt in contact with said second shaft.

11. Filter apparatus according to claim 1 in which first fixed guide means is mounted on said apparatus on one side of said tank adjacent said supply means, second fixed guide means is mounted on said apparatus on the other side of said tank remote from said supply means, both said first and second guide means being generally in line with the bottom of said tank, a third fixed guide means is mounted on said apparatus above said tank adjacent to said exposed area, and said sheet passes around said fixed guide means before being wrapped around said drum.

12. Filter apparatus according to claim 11 in which said first, second and third fixed guide means comprise rollers contacted by said sheet passing thereover.

13. Filter apparatus according to claim 2 in which a exposed area covering means comprises a flexible strip of material having a sharp bend therein forming said stripping means as a knife edge.

14. Filter apparatus according to claim 13 in which said bent covering means is formed into two panels, one panel being shorter than the other panel and positioned to extend from the edge of said plate in abutting relation therewith, and the longer panel comprising said part extending downwardly and being formed in an arc with the same circumference as said rotary drum to fit tightly thereagainst.

15. Filter apparatus according to claim 1 in which said carrier web is formed of plastic mesh material, and said abutting sheet is formed of newsprint to provide for the filtering of the solids.

16. The filter apparatus of claim 1 wherein said stripping means has a part thereof extending downwardly to cover said exposed area.

* * * * *

UNITED STATES PATENT OFFICE
CERTIFICATE OF CORRECTION

Patent No. 3,791,527　　　　　　　　Dated February 12, 1974

Inventor(s)　　Harry Ball, et al

It is certified that error appears in the above-identified patent and that said Letters Patent are hereby corrected as shown below:

Column 6, line 45:　change "It" to --In--

Column 7, line 6 :　change "sealing" to --stripping-- line 16:　change "sealing" to --stripping-- line 20:　change "sealing" to --stripping-- line 36:　delete "and sealing"

Column 8, line 36:　change "sealing" to --stripping--

UNITED STATES PATENT OFFICE
CERTIFICATE OF CORRECTION

Page 2

Patent No. 3,791,527          Dated February 12, 1974

Inventor(s) Harry Ball, et al

It is certified that error appears in the above-identified patent and that said Letters Patent are hereby corrected as shown below:

Column 7, line 67: change "apper" to --paper--

Column 8, line 1 : change "paper" to --100--

Signed and sealed this 8th day of October 1974.

(SEAL)
Attest:

McCOY M. GIBSON JR.  
Attesting Officer

C. MARSHALL DANN  
Commissioner of Patents